United States Patent Office 3,358,034
Patented Dec. 12, 1967

3,358,034
SELECTIVE HYDROBORATION PROCESS
Herbert C. Brown, 1840 Garden St.
West Lafayette, Ind. 47906
No Drawing. Filed Mar. 12, 1964, Ser. No. 351,556
15 Claims. (Cl. 260—606.5)

ABSTRACT OF THE DISCLOSURE

This invention concerns a process for separating an alpha olefin from a hydrocarbon mixture, including at least an internal olefin or a vinylidene olefin, by heating the mixture with a displaceable triorganoborane to cause selective displacement of organo groups in the triorganoborane with the alpha olefin and then recovering the produced corresponding trialkylborane from the mixture. The alpha olefin may be recovered from the trialkylborane by a further displacement or the trialkylborane may be oxidized and hydrolyzed to produce a primary alcohol.

---

This invention relates to and has as its chief object the provision of a process for selectively reacting an alpha olefin content of a hydrocarbon mixture with suitable organoboranes so that the alpha olefins may be selectively separated from other reactive hydrocarbons (e.g. internal or vinylidene olefins, or both) and regenerated in purified form or may be selectively converted into desirable derivatives such as primary alkanols, etc. Other objects and accomplishments of this invention will be apparent from the ensuing description and appended claims.

It is frequently desirable to separate olefins of a specific structural type from olefins of other structural types. Thus for the synthesis of detergents the alpha olefin, $RCH=CH_2$, is greatly preferred over the internal olefin, $RCH=CHR'$. Similarly, for the synthesis of secondary alcohols by hydration, it is necessary to have internal olefins, $RCH=CHR'$, free of the trisubstituted olefins, $RR'CH=CHR''$, which hydrate to the less stable tertiary alcohols.

A prime source of such olefins are hydrocarbon streams in a petroleum refinery. Alternatively, cracked paraffin wax is being utilized to produce such olefins. Unfortunately, such source frequently contains the olefins in complex mixtures made up of two or more structural types, such as $RCH=CH_2$ (monosubstituted), $$RCH=CHR'$$

and $RR'C=CH_2$ (disubstituted), $RR'C=CHR''$ (trisubstituted) and $RR'C=CR''R'''$ (tetrasubstituted). It is highly desired to have a simple, economic process to separate specific structural type from such mixtures.

In my patent (U.S. 2,993,933) I taught that treatment of a mixture of alpha and internal olefins, $RCH=CH_2$ and $RCH=CHR'$, with a controlled quantity of diborane at 0 to 25° C. brought about a selective conversion of the alpha olefin into the corresponding trialkylborane, permitting the ready separation of the internal olefin in pure state. The organoborane from the alpha olefin can be oxidized to the desired primary alcohol, or it can be reconverted to the desired alpha olefin by heating with another olefin.

Unfortunately, diborane is not as selective as might be wished. For example, rate studies show that the rate of reaction of 1-pentene with diborane is faster than that of 2-pentene by a factor of only 3 [H. C. Brown and A. W. Moerikofer, J. Am. Chem. Soc. 85, 2063–5 (1963)]. This means that the hydroboration of a mixture of 1-pentene and 2-pentene, or of a particular alpha olefin and its related internal olefin, results in the simultaneous conversion of some of the less reactive structure.

Dialkylboranes, such as diisoamyl borane, taught in my patent, U.S. 3,078,313, are far more selective. Thus the relative rate of reaction of 1-pentene and cis-2-pentene with this reagent is 52 [H. C. Brown and A. W. Moerikofer, J. Am. Chem. Soc., 85, 2063–5 (1963)]. Related data are shown in Table I.

Table I

| Olefin: | Relative reactivity |
|---|---|
| 1-pentene | 105 |
| 2-methyl-1-pentene | 4.9 |
| Cis-2-pentene | 2.0 |
| Cis-4-methyl-2-pentene | 0.5 |
| Cis-2,4-dimethyl-2-pentene | 0.1 |

The reagent diisoamylborane is prepared by reacting 2 moles of 2-methyl-2-butene per mole of borane ($BH_3$). This means that only one of the three hydrides in diborane is available for the selective hydroboration. This is evidently wasteful.

It is obviously desirable to make diborane itself more selective. This can be accomplished by going to lower temperatures. Unfortunately, this is uneconomical because of the slow rate and the cost of cooling the mixtures.

It is also possible to achieve the hydroboration of olefins by a displacement reaction $$3RCH=CH_2 + (R'CH-CH_2)_3B \xrightarrow{100\ to\ 200°\ C.} 3R'CH=CH_2 + (RCHCH_2)_3B$$

For example, R. Koster (U.S. 2,886,599) showed that on heating triisobutylborane with 1-decene, isobutylene distilled off and tri-n-decylboron was obtained. In the same way the use of 6-dodecene led to the synthesis of tri-sec-dodecylboron. However, this reaction requires elevated temperatures—in the neighborhood of 100 to 200° C. It is generally known that reactions are more selective the lower the temperature, becoming less selective the higher the temperature. Consequently, it would have been anticipated that the high temperature required for hydroboration via displacement would cause this reaction to be of low selectivity, less selective than with diborane itself at 25° C. However, I have discovered a displacement reaction of unusually high selectivity even though use is made of temperatures in the range of about 100° C. to about 250° C.

In accordance with this invention an alpha olefin content of a multicomponent hydrocarbon mixture is selectively converted into a corresponding trialkylborane product by heating the hydrocarbon mixture with a displaceable triorganoborane at a temperature in the range of from about 100° C. to about 250° C. and for a time sufficient to cause alpha olefin displacement of organo groups from the triorganoborane and to produce selectively the corresponding trialkylborane product. In this process the initial hydrocarbon mixture includes, in addition to the alpha olefin content, an internal olefin content or a vinylidene olefin content, or both. Other common hydrocarbons (e.g., paraffins, aromatics) may also be copresent in the hydrocarbon mixture as they do not impair this selective displacement reaction.

The alpha olefin displacement is essentially the only displacement reaction which occurs on heating the initial hydrocarbon mixture with the organoborane reactant under the appropriate time-temperature conditions specified above. Thus, the reaction of alpha olefins is highly selective even though the initial reaction mixture contains, and the reaction itself is conducted in the presence of, other reactive hydrocarbons such as internal and/or vinylidene olefins which are known to undergo displacement reactions with organoboranes under similar reaction conditions. The high selectivity of this process is therefore quite unexpected.

A variety of reaction media can be employed without interfering with the selectivity of the alpha olefin displacement reaction. Thus the reaction can be conducted in the presence of aromatic hydrocarbons, paraffinic hydrocarbons, cycloparaffinic hydrocarbons, and the like, which may be added to the reaction mixture as separate diluents or may be present in the initial complex hydrocarbon mixture from which the alpha olefin content is to be selectively reacted. In this connection paraffinic and cycloparaffinic hydrocarbons are known (U.S. 3,101,376) to undergo displacement reactions when heated with organoboranes to temperatures of 200° C. to 450° C. Nevertheless, these types of hydrocarbons are essentially inert when present in the reaction mixtures being subjected to the present selective displacement process.

In preferred embodiments of this invention, recourse is had to the use of ethers, and especially to polyethers such as the dimethyl ether of diethylene glycol in order to obtain the beneficial catalytic activity of these ethers in accelerating the rate of the desired displacement reaction. For this purpose, it is particularly desirable to employ the polyether displacement catalysts described in my Patent U.S. 3,078,308. The unusual selectivity of the present process is not upset by the copresence of these catalytic polyether displacement catalysts.

This invention provides an effective, efficient and economical means for selectively converting the alpha olefin content of the initial hydrocarbon mixture into primary alcohols, many of which are of commercial importance in the chemical and allied arts. For example, straight chain primary alcohols, which are useful as detergents, can be readily and selectively produced by treating a hydrocarbon mixture, including straight chain alpha olefins as well as other less desirable olefins which are normally associated therewith (e.g., internal olefins, vinylidene olefins, etc.) with a suitable organoborane reactant under the above noted conditions. Thereupon, the resultant tri-n-alkylborane product is subjected to oxidation and hydrolysis to produce the corresponding primary alcohol, in this instance a straight chain primary alcohol. Consequently, one advantageous embodiment of this invention is the process of selectively converting an alpha olefin content of a hydrocarbon mixture into a corresponding primary alcohol, this hydrocarbon mixture including, in addition to the alpha olefin content, at least one member of the group consisting of an internal olefin content and a vinylidene olefin content. This process comprises heating a displaceable triorganoborane with the hydrocarbon mixtures at a temperature in the range of from about 100° C. to about 250° C. and for a time sufficient to cause alpha olefin displacement of organo groups from the triorganoborane and to produce selectively the corresponding trialkylborane product; and thereafter subjecting the trialkylborane product to oxidation and hydrolysis to produce the corresponding primary alcohol. This oxidation and hydrolysis procedure is preferably conducted in the presence of the unreacted internal and/or vinylidene olefins as these are useful, convenient solvents for this purpose.

Preferred embodiments of this invention relate to multistep processes for selectively separating alpha olefin contents from the complex hydrocarbon mixtures so that by means of the technology herein described the desired alpha olefins are selectively isolated in specie. To accomplish this objective, I selectively separate an alpha olefin content from a hydrocarbon mixture including, in addition to the alpha olefin content, at least one member of the group consisting of an internal olefin content and a vinylidene olefin content, by a process comprising the steps of (1) Heating a displaceable triorganoborane with the the hydrocarbon mixture at a temperature in the range of from about 100° C. to about 250° C. and for a time sufficient to cause alpha olefin displacement of organo groups from the triorganoborane and to produce selectively the corresponding trialkylborane product, (2) Effecting a separation between the free hydrocarbons in the reaction mixture and the trialkylborane product, and (3) Heating the trialkylborane product with an olefinic hydrocarbon at a temperature of from about 100° C. to about 250° C. and for a time sufficient to displace the alkyl groups of this trialkylborane product by the olefinic hydrocarbon thereby forming an alpha olefin hydrocarbon corresponding to that originally present in the hydrocarbon mixture.

If desired, Step 3 above can employ a paraffinic hydrocarbon to cause displacement of the alkyl groups from the trialkylborane product by utilizing the condition described in U.S. Patent 3,101,376. However, the use of olefins as above described is generally more desirable for this purpose as the reaction proceeds more readily under milder reaction conditions and is less likely to result in contamination of the desired regenerated alpha olefin hydrocarbon product. These final displacing olefins are preferably used in an amount ranging from about 0.5 mole to about 6 moles per mole of the trialkylborane product undergoing the final displacement reaction. However, these amounts are not particularly critical and are therefore susceptible to considerable variation. For example, an appreciable excess—e.g., as high as 50 or more moles per mole of trialkylborane product—can be used depending upon such factors as the size and capacity of the reaction equipment being employed.

Steps 1 and 3 of the above preferred embodiment are preferably conducted in the presence of suitable reaction diluents such as ethers and especially in admixture with polyether displacement catalysts of the type referred to above.

In each of the embodiments of this invention the more important criteria to be observed are to heat the initial displaceable triorganoborane with the initial hydrocarbon mixture at a temperature in the range of from about 100° C. to about 250° C., and preferably from about 100° C. to about 200° C., and for a time sufficient to cause the alpha olefin of the initial hydrocarbon mixture to selectively react with the triorganoborane reactant. The precise temperatures and reaction times will vary to some extent, the optimum conditions for one type of hydrocarbon mixture and one type of initial organoborane reagent not necessarily corresponding to the optimum conditions for other initial reactants. Thus, in each instance it is desirable to select those time-temperature conditions which most readily accomplish the objectives of this invention, taking into account the composition of the initial hydrocarbon mixture, the identity and amount of the initial triorganoborane reactant, the reaction rate desired, the extent of the chemical conversion desired, and the like. The optimum time-temperature conditions can readily be ascertained for any given situation by making use of simple trial experiments or pilot runs.

The chief requirement of the initial triorganoborane reactant used in the various embodiments of this invention is that it be a displaceable triorganoborane. By this is meant that the triorganoborane compound be one which is capable under the reaction conditions of undergoing known types of displacement reactions when heated under appropriate conditions with olefinic and/or paraffinic hydrocarbons. The nature of these displaceable triorganoborane reactants will therefore be readily apparent to those skilled in the art on the basis of known chemical technology and reports in the literature.

Generally speaking, however, it is preferable to use trialkylboranes or tricycloalkylboranes as the initial displaceable triorganoborane reactant as these compounds give rise to highly selective reactions and are readily prepared from available and relatively inexpensive starting materials. Specifically preferred displaceable triorganoborane reactants are trialkylboranes having from about 3 to about 8 carbon atoms in each alkyl group and tricycloalkylboranes having a ring of from about 5 to about 6 carbon atoms in each cycloalkyl group. In many instances the use of tri-n-propylborane is especially preferred.

Under normal conditions it is preferable to use an amount of the displaceable triorganoborane corresponding to not more than about 0.33 mole thereof per mole of the total alpha olefin content of the initial hydrocarbon mixture. In this way, one achieves the greatest selectivity of alpha olefin displacement reaction at the lowest cost. However, under appropriate reaction conditions within the range described above still greater amounts of displaceable triorganoborane reactants can be used if desired, although in such cases greater care in the control of the reaction conditions will be required in order to maintain the highest order of selectivity characterizing this invention.

The displaceable triorganoborane may contain various types of organo groups, such as is obtained in the hydroboration of a mixture of alpha, internal and vinylidene olefins, or in the isomerization of the organoborane containing such mixed groups. In this case, heating the mixed triorganoborane with sufficient alpha olefin to displace the less desirable internal and vinylidene olefins produces an organoborane which is essentially pure tri-primary-organoborane and free of the less desirable organo residues. Simple distillation of the displaced olefins yields the pure tri-primary-organoborane, ideal for conversion to detergent alcohols and similar applications.

As noted above, the initial hydrocarbon mixture includes, in addition to the alpha olefin content, at least an internal olefin content or a vinylidene olefin content, or both, although additional hydrocarbons such as aromatic, paraffinic, cycloparaffinic, and the like may also be copresent. The proportions of the alpha olefin content vis-a-vis the internal olefin content and/or vinylidene olefin content are not critical and will largely be dictated by the source from which the hydrocarbon mixture is derived, and the prior treatments (e.g., distillation, solvent treatments, etc.) to which the mixture has been subjected. In most instances the initial hydrocarbon mixture will contain from about 5 to about 95 mole percent of the alpha olefin, the balance being the internal olefins, the vinylidene olefins, or both. The same considerations apply to an even more complex hydrocarbon mixture containing in addition to the alpha olefins content and either or both of the internal and vinylidene contents, other hydrocarbons such as aromatics, paraffins, and/or cycloparaffins. Thus these even more complex hydrocarbon mixtures will generally contain from about 5 to about 95 mole percent of alpha olefins, the balance being the other hydrocarbon types such as those herein noted, at least 2 to 3 mole percent of the total mixture being internal and/or vinylidene olefins. In general, the preferred hydrocarbon will contain from about 40 to about 95 mole percent of alpha olefins, the balance being other hydrocarbons which are essentially inert under the present reaction conditions and including specifically at least about 5 mole percent of internal olefins, vinylidene olefins or both. The initial hydrocarbon mixtures are in general those which are liquid under the temperature and pressure conditions which are maintained within the reaction zone. Thus, in general, the olefins of the hydrocarbon mixture will have the molecule from about 4 to about 30 carbon atoms, preferably from about 5 to about 18 carbon atoms.

In this connection, the present process will be applied to hydrocarbon mixtures the olefin contents of which are in the range of from about 5 to about 18 carbon atoms when the process is being utilized for the separation and recovery of alpha olefin monomers suitable for making olefinic-type polymers.

On the other hand, when the objective of the process is to produce primary alcohols for use as detergents the olefin content of the initial hydrocarbon mixture will consist essentially of olefins having in the molecule from about 10 to about 16 carbon atoms.

In preferred embodiments of this invention the alpha olefin content and the internal olefin content and/or vinylidene olefin content will have in the respective molecules essentially the same number of carbon atoms, most preferably within the range of from about 5 to about 18. Thus preferred hydrocarbon mixtures will consist essentially of one or more species of internal and/or vinylidene olefins having the same number of carbon atoms as the alpha olefin content thereof. If, for example, the alpha olefin content of the mixture is essentially 1-decene the mixture will also preferably contain one or more internal isomer of decene or one or more vinylidene isomer of 1-decene, or both. By the same token, if the alpha olefin content is essentially a mixture of 1-tetradecene and 1-hexadecene then the mixture will preferably contain internal isomers of both of these hydrocarbons of vinylidene isomers of both of these hydrocarbons, or will contain all of them.

It is preferable to utilize a displaceable triorganoborane reactant (preferably a trialkylborane) in which the number of carbon atoms in each of the organo groups is less than the molecular carbon atom content of the olefins contained in the initial hydrocarbon mixture from which the alpha olefin content is to be selectively reacted. This enables the olefinic compound which is displaced from the initial triorganoborane to be readily removed from the reaction zone, e.g., by suitable distillation techniques. Hence, if the initial triorganoborane reactant is tri-n-propylborane the selective alpha olefin displacement reaction therewith will release propylene which is readily removed from the reaction zone. Therefore, in general it is preferable to employ displaceable trialkylborane whose alkyl groups each contain fewer carbon atoms than the molecular carbon atom content of the alpha olefin hydrocarbon-containing reactant.

When utilizing the process of this invention to separate alpha olefins from more complex olefin hydrocarbon-containing mixtures by means of the multi-step procedure described above, it is desirable that the number of carbon atoms of the olefinic hydrocarbon reactant in the displacement reaction of Step 3 correspond to the number of carbon atoms of the trialkylborane reactant utilized in the earlier displacement reaction of Step 1. For example, to separate 1-octene from a mixture consisting essentially of 1-octene and 2-octene, Step 1 would preferably involve reaction of this mixture under the herein specified conditions with, say, tri-n-propylborane. On completion of this selective reaction which provides a reaction mixture composed of tri-n-octylborane, propylene and 2-octene, the propylene is readily withdrawn from the reaction scene and a separation effected between the 2-octene and the tri-n-octylborane. Thereupon the tri-n-ocylborane is most preferably reacted with propylene under the herein specified conditions so as to liberate pure 1-octene and regenerate tri-n-propylborane for further use in the first step of the process. It will therefore be evident to one skilled in the art that in conducting such a process on a commercial scale the use of recycle techniques will be advantageous in order to permit continuous reuse of the boron values of the system.

This invention and its advantageous features will be still further apparent from the following examples which are presented for illustrative purposes only and are not to be construed as in any way limiting the scope of the present invention. In these examples, all parts and percentages are by weight unless otherwise specified.

Example I

A mixture of 40 mmoles (milli-moles) of 1-decene and 40 mmoles of 2-octene was heated to a temperature of 160° C. with 13.5 mmoles of tri-n-pentylborane in the dimethyl ether of diethylene glycol. 1-pentene was allowed to distill out as it was formed. Samples of the reaction mixture were withdrawn at regular intervals and analyzed by vapor phase chromatography for residual olefin. The following results were realized:

| Time, Hrs. | Percent 1-decene | Percent 2-octene |
| --- | --- | --- |
| 0 | 50 | 50 |
| 1½ | 34 | 66 |
| 3 | 25 | 75 |
| 5 | 10 | 90 |
| 7 | 4 | 96 |
| 10 | 1 | 99 |

In the above experiment, 1-decene and 2-octene were utilized only to simplify the analysis. Similar results can be realized with isomeric mixtures of 1-decene and 2-decene, 1-dodecene and 2-dodecene, 1-dodecene and mixtures of 2,3,4,5 and 6-dodecenes.

The above example illustrates the application of the present process for the selective reaction of an alpha olefin content from a mixture consisting essentially of an alpha olefin content and an internal olefin content. Example II below illustrates the application of this process to the selective reaction of an alpha olefin content from a mixture consisting essentially of an alpha olefin content and a vinylidene olefin content.

Example II

The procedure of Example I is repeated in all particulars with the exception that the hydrocarbon mixture is composed of 40 mmoles of 1-dodecene and 60 mmoles of the isomeric vinylidene olefin, 1,1-di-n-pentylethylene. Analysis of the reaction mixture shows that essentially all of the 1-dodecene has reacted with the tri-n-pentylborane with essentially all of the 1,1-di-n-pentylethylene remaining unreacted.

Example III below is illustrative of an economical multi-step process for the separation of alpha olefins from among a mixture consisting essentially of either internal or vinylidene olefins, or both.

Example III

A mixture of the alpha olefin containing either internal or vinylidene olefins (or both) as undesired components is treated with tri-n-propyl boron (preferably in up to molar equivalent to the alpha olefin present) at temperatures in the range of 100° C. to approximately 200° C. until the propylene has been essentially completely displaced, yielding a mixture of the organoborane from the desired alpha olefin and the free residual internal and/or vinylidene olefin. The latter olefins are distilled away from the less volatile organoborane. The latter is now heated under pressure with propylene to transfer the boron to the propylene and yield the desired alpha olefin in pure state. The tri-n-propylboron is separated by flashing off the excess propylene, distilling the tri-n-propylboron from the alpha olefin at a temperature below 130° C. where the displacement reaction is slow, and recycling the tri-n-propylboron to the selective hydroboration stage.

The process is illustrated for the separation of 1-dodecene in the following equations:

(1)

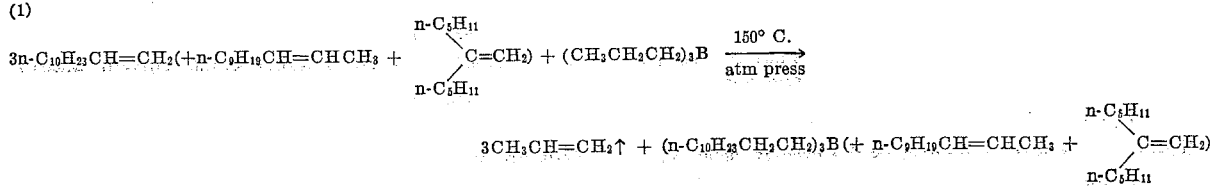

(2) Distillation under 130° C. yields $$(n\text{-}C_{10}H_{22}CH_2CH_2)_3B$$

as bottoms and the internal and vinylic olefins as the volatile overhead.

(3)

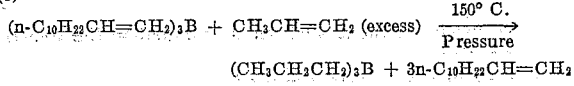

(4)

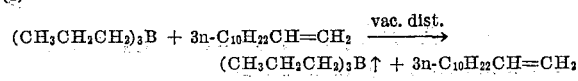

The precise cycle to be utilized will obviously depend on the olefin to be separated. In the above example, tri-n-propylboron is more volatile than the desired product, 1-dodecene, facilitating the separation. However, if it were desired to separate 1-decene, it would be advantageous to use 1-butene and tri-n-pentylborane in the cycle. In this case the desired olefin could be distilled away from the less volatile organoborane.

It is to be noted that this process does not involve any appreciable costs for materials. The boron atom is temporarily attached to the alpha olefin to reduce its volatility and permit its easy separation from isomeric olefins of similar volatility.

It will be evident that this selective hydroboration has many applications other than in the above process for separating alpha olefins. Thus, it is frequently desired to convert alpha olefins into primary alcohols without simultaneously converting the isomeric internal and vinylic olefins into the alcohols, which are generally much less stable and less desirable.

Thus it is possible to treat a mixture of 1-decene and 2-decene with a readily synthesized organoboron such as triisobutylboron, and to hydroborate the 1-decene selectively, preferably by utilizing not more than one equivalent of the organoborane per mole of alpha olefin present in the reaction mixture. The organoborane selectively formed from the 1-decene is then oxidized and hydrolyzed using such materials as alkaline peroxide or the amine-oxygen systems of U.S. 3,061,626. Such a procedure is exemplified by Example IV.

Example IV

Treatment of 1 mole of 1-decene and 1 mole of 2-decene with 0.33 mole of triisobutylborane at 160° C. for five hours results in the selective reaction of 1-decene to form tri-n-decylborane, with essentially all of the 2-decene left unreacted. Thereupon the reaction product is oxidized with alkaline peroxide (e.g., 3 N aqueous NaOH solution; 30 percent $H_2O_2$ solution) to produce n-decanol in admixture with the 2-decene. Thereupon the 2-decene is separated from the alcohol by distillation.

In the above example, the triisobutylborane may be prepared in situ from triisobutylaluminum by reacting the same with trimethylborate. Thereupon this reaction mixture is added to the mixture of alpha olefin and the internal and/or vinylic olefin. Again the triisobutylboron selectively reacts with the alpha olefin present, this being essentially the only displacement reaction occurring under the specified conditions.

The displaceable triorganoborane reactant employed in this invention generally has organo radicals having at least three carbon atoms in each radical so that when displacement by the unsaturated reactant occurs, an olefinic material is liberated. Thus, the organic portion will have an alkyl configuration of at least three carbon atoms in length, but it is to be understood that the alkyl group can have further constituents on the second or other carbon atoms including radicals such as alkenyl, cycloalkyl, cycloalkenyl, aryl, alkaryl, and acetylenic. Typical examples of the boron reactant include: tri-n-propylborane, triisopropylborane, tri-n-butylborane, triisobutylborane, tri-n-pentylborane, tri-n-hexylborane, tri-n-octylborane, diethylcyclohexylborane, tri - (2 - phenylethyl)borane, dicyclopentylborane, and the like. It is to be understood that the hydrocarbon groupings mentioned above can be further substituted with organic functional groups provided such are essentially inert to the reaction. Included among such functional groups are, for example, the halogens, alkoxy groups, ester groups, and the like. For ease of operation and because of greater availability, the trihydrocarbon boranes are preferred.

The initial hydrocarbon mixtures, which generally comprise alpha olefins and internal olefins and/or beta-branched or vinylidene olefins, can be two component systems such as 4-methylpentene-1 and 2-methylpentene-2; octadecene-1 and dodecene-2; heptadecene-1 and heptadecene-2; hexadecene-1 and hexadecene-2; tetradecene-1 and 7-ethyldodecene-8; dodecene-1 and dodecene-4; dodecene-1 and octadecene-3; butene-1 and butene-2; 2-ethylhexene-1 and octene-2; tetradecene-1 and tetradecene-2; pentadecene-1 and pentadecene-3; three component mixtures such as decene-1, decene-2 and tetradecene; decene-1, tetradecene-1 and tetradecene-4; eicosene-1, octadecene-1 and hexadecene-5; hexene-1, octene-1 and decene-4; octene-1, octene-2 and octene-3; decene-1, decene-2 and decene-4; dodecene-1, dodecene-2 and dodecene-3; hexadecene-1, hexadecene-2 and hexadecene-4; four component mixtures such as octene-1, decene-1, dodecene-2 and octadecene; decene-1, dodecene-1, tetradecene-2 and hexadecene-2; tetradecene-1, tetradecene-2, tetradecene-3 and tetradecene-4; tetradecene-1, hexadecene-1, tetradecene-2 and hexadecene-2; dotriacontene-1, octacosene-1, hexacosene-2 and eicosene; octene-1, decene-1, 3-ethyldecene-4 and 2-ethyltetradecene-2; five component mixtures such as octene-1, decene-1, dodecene-1, tetradecene-2 and 2-ethyltetradecene-2; hexene-1, octene-1, nonene-1, undecene-2 and tetradecene; octadecene-1, octadecene-2, octadecene-3, octadecene-4 and octadecene-5; and the like. Other such mixtures containing from six components up to 50 or more components may also be selectively reacted by the process of this invention. Generally, hydrocarbons having from 2 to 60 carbon atoms will make up the individual components of such mixtures.

Examples of the polyethers which are preferably employed as displacement media are those having the configuration RO(CH$_2$)$_n$OR wherein R is an organic radical, preferably an alkyl or alkoxy-alkyl radical, and $n$ is a small whole number as between about 1 to 10, preferably 1 to 4 inclusive. For example, such polyethers include ethylene glycol ether methyl ether; diethyl ether of ethylene glycol; methyl-n-propyl ether of ethylene glycol; tetraethylene glycol dimethyl ether; glycerol trimethyl ether; dimethyl ether of diethylene glycol; dibutyl ether of diethylene glycol; dimethoxyethane; diethyl ether of diethylene glycol; and the like. Other polyethers which can be employed include for example, pyrocatechol dimethyl ether; resorcinol dimethyl ether; 1,2,4-trimethoxybenzene, and the like.

Typical examples of the cyclic ethers which are employable include tetrahydrofuran, 1,4-dioxane, furan and the like. Also suitable as reaction diluents are simple ethers (e.g., dioctyl ether, methyl phenyl ether, dibutyl ether, etc.); halogenated hydrocarbons; and the like.

The pressures used in this process will largely depend on the particular reaction temperature and on the nature of the reactants and of the diluents, if used. Thus the pressures will generally be sufficient to keep the system predominantly in the liquid state at the selected displacement temperature. Thus atmospheric or ambient pressures are often suitable although elevated or reduced pressures can be used depending upon the particular situation. Thus with a reaction involving only very high boiling components, pressures as low as a fraction (e.g., $\frac{1}{10}$) of an atmosphere can be used. On the other hand pressures as high as several thousand pounds per square inch may be used when dealing with low boiling components.

Reaction contact, or residence times will likewise vary from matters of minutes to hours (e.g., from 5 or 10 minutes to 24 or 36 hours) depending on the nature of the reactants, the presence or absence of a displacement catalyst, the reaction temperature, the conversion or yield desired, and the like.

As noted above, best results are achieved when using up to one theory or equivalent of displaceable organoborane per theory or equivalent of alpha olefin in the reaction zone. It is often desirable to run the process at a low conversion per pass in which case there may be as little as $\frac{1}{100}$ (or less) of a theory of displaceable organoborane per theory of alpha olefin. But under suitable circumstances (e.g. when very short reaction times are used) one may employ as much as 3–5 theories of displaceable organoborane per theory of alpha olefin.

What is claimed is:

1. A process for selectively converting an alpha olefin content of a hydrocarbon mixture into a corresponding trialkylborane product, said hydrocarbon mixture including, in addition to said alpha olefin content, at least one member of the group consisting of an internal olefin content and a vinylidene olefin content, which process comprises heating a displaceable triorganoborane with said hydrocarbon mixture at a temperature in the range of from about 100° C. to about 250° C. and for a time sufficient to cause alpha olefin displacement of organo groups from said triorganoborane and to produce selectively the corresponding trialkylborane product.

2. The process of claim 1 wherein said displaceable triorganoborane is a trialkylborane.

3. The process of claim 1 wherein said displaceable triorganoborane is trialkylborane having from about 3 to about 8 carbon atoms in each alkyl group.

4. The process of claim 1 further characterized in that the amount of the said displaceable triorganoborane is equivalent to not more than about 0.33 mole thereof per mole of the total alpha olefin content of said hydrocarbon mixture.

5. The process of claim 1 wherein said displaceable triorganoborane is a tricycloalkylborane having rings of from 5 to 6 carbon atoms in each cycloalkyl group.

6. The process of claim 1 further characterized by being conducted in the presence of an inert reaction diluent.

7. The process of claim 1 further characterized by being conducted in the presence of an inert hydrocarbon reaction diluent.

8. The process of claim 1 further characterized by being conducted in the presence of a paraffinic hydrocarbon reaction diluent.

9. The process of claim 1 further characterized by being conducted in the presence of an ether reaction diluent.

10. The process of claim 1 further characterized by being conducted in the presence of a polyether reaction diluent.

11. The process of claim 1 further characterized in that said temperature is in the range of from about 100° C. to about 200° C.

12. A process of selectively separating an alpha olefin content from a hydrocarbon mixture including, in addition to said alpha olefin content, at least one member of the group consisting of an internal olefin content and a vinylidene olefin content, which process comprises the steps of
(1) Heating a displaceable triorganoborane with said hydrocarbon mixture at a temperature in the range of from about 100° C. to about 250° C. and for a time sufficient to cause alpha olefin displacement of organo groups from said displaceable triorganoborane and to produce selectively the corresponding trialkylborane product,
(2) Effecting a separation between the free hydrocarbons in the reaction mixture and said trialkylborane product, and
(3) Heating said trialkylborane product with an olefinic hydrocarbon at a temperature of from about 100° C. to about 250° C. and for a time sufficient to displace the alkyl groups of said trialkylborane products by said olefinic hydrocarbon thereby forming an alpha olefin hydrocarbon corresponding to that originally present in said hydrocarbon mixture.

13. The process of claim 12 wherein said displaceable triorganoborane is a trialkylborane.

14. The process of claim 12 wherein said displaceable triorganoborane is a trialkylborane having from about 3 to about 8 carbon atoms in each alkyl group.

15. The process of claim 12 wherein said displaceable triorganoborane is tricycloalkylborane having rings of from 5 to 6 carbon atoms in each cycloalkyl group.

References Cited
UNITED STATES PATENTS

| | | | |
|---|---|---|---|
| 2,993,933 | 7/1961 | Brown | 260—606.5 |
| 3,115,526 | 12/1963 | D'Alelio | 260—606.5 |
| 3,131,225 | 4/1964 | Rutkowski et al. | 260—606.5 |

TOBIAS E. LEVOW, *Primary Examiner.*

W. F. W. BELLAMY, *Assistant Examiner.*

UNITED STATES PATENT OFFICE
CERTIFICATE OF CORRECTION

Patent No. 3,358,034                          December 12, 1967

Herbert C. Brown

It is hereby certified that error appears in the above numbered patent requiring correction and that the said Letters Patent should read as corrected below.

Column 1, after line 19, insert -- BACKGROUND OF THE INVENTION --; column 2, lines 30 and 31, the equation should appear as shown below instead of as in the patent:

$$3RCH=CH_2 + (R'CH_2-CH_2)_3B \xrightarrow{100 \text{ to } 200°C.}$$
$$3R'CH=CH_2 + (RCH_2CH_2)_3B$$

column 5, line 59, after "drocarbon" insert -- mixtures --; columns 7 and 8, equation (1) should appear as shown below instead of as in the patent:

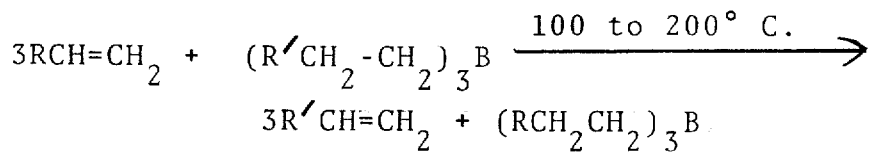

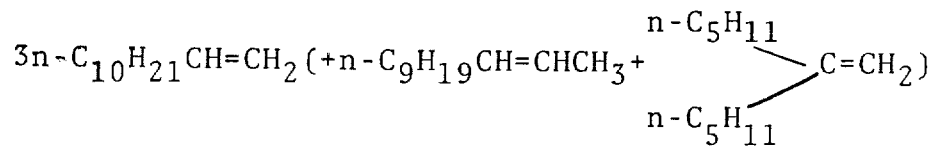

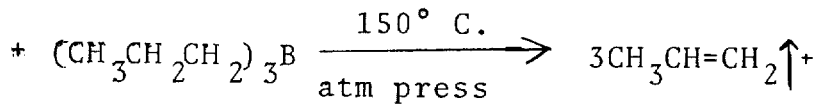

column 8, line 18, the equation should appear as shown below instead of as in the patent:

$$(n-C_{10}H_{21}CH_2CH_2)_3B$$

line 19, for "vinylic" read -- vinylidene --; equation (3) should appear as shown below instead of as in the patent:

$$(n-C_{10}H_{21}CH=CH_2)_3B + CH_3CH=CH_2 \text{(excess)} \xrightarrow[\text{Pressure}]{150°C.}$$
$$(CH_3CH_2CH_2)_3B + 3n-C_{10}H_{21}CH=CH_2$$

same column 8, equation (4) should appear as shown below instead of as in the patent:

$$(CH_3CH_2CH_2)_3B + 3n\text{-}C_{10}H_{21}CH=CH_2 \xrightarrow{\text{vac. dist.}} (CH_3CH_2CH_2)_3B \uparrow + 3n\text{-}C_{10}H_{21}CH=CH_2$$

Signed and sealed this 22nd day of July 1969.

(SEAL)
Attest:

EDWARD M. FLETCHER, JR.
Attesting Officer

WILLIAM E. SCHUYLER, JR.
Commissioner of Patents